United States Patent [19]

Lioutas

[11] Patent Number: 4,832,969

[45] Date of Patent: May 23, 1989

[54] DRIED GREEN VEGETABLE AND METHOD OF PREPARATION

[75] Inventor: Theodore S. Lioutas, Plymouth, Minn.

[73] Assignee: General Mills, Inc., Minneapolis, Minn.

[21] Appl. No.: 135,554

[22] Filed: Dec. 16, 1987

Related U.S. Application Data

[63] Continuation of Ser. No. 923,992, Oct. 28, 1986, abandoned.

[51] Int. Cl.$^4$ .............................................. A23B 7/02
[52] U.S. Cl. ................................. 426/270; 426/324; 426/419; 426/615
[58] Field of Search ............... 426/210, 321, 810, 419, 426/615, 444, 443, 442, 456, 267, 262, 639, 640, 324

[56] References Cited

U.S. PATENT DOCUMENTS

| | | | |
|---|---|---|---|
| 2,191,835 | 2/1940 | Snelling | 426/615 |
| 3,408,208 | 10/1968 | Lamb | 426/444 |
| 3,623,893 | 11/1971 | Mauge . | |
| 3,745,027 | 7/1973 | Kaplow et al. . | |
| 3,930,034 | 12/1975 | Shanbhag et al. | 426/270 |
| 4,002,772 | 1/1977 | Haas | 426/444 |
| 4,103,035 | 7/1978 | Fulger et al. | 426/321 |
| 4,350,711 | 9/1982 | Kahn et al. . | |
| 4,361,589 | 11/1982 | Wauters et al. | 426/321 |
| 4,390,550 | 6/1983 | Kahn | 426/639 |
| 4,447,460 | 5/1984 | Lewis et al. . | |
| 4,473,591 | 9/1984 | Segner et al. . | |
| 4,478,860 | 10/1984 | Hekal et al. . | |
| 4,542,033 | 9/1985 | Agarwala | 426/640 |
| 4,564,527 | 1/1986 | Bucsko et al. . | |

OTHER PUBLICATIONS

Driver et al., Abstracts of Papers ACS 1976, 172 AGFD 91 (Abstract only).
Francis, 1975, Food Colorimetry Theory and Applications, pp. 214–226, Avi Publishing Company, Inc., Westport, Conn.

*Primary Examiner*—Donald E. Czaja
*Assistant Examiner*—Carolyn Paden
*Attorney, Agent, or Firm*—John A. O'Toole

[57] ABSTRACT

Disclosed are dried green vegetables, especially broccoli florets and pea-pods, characterized by superior color retention compared to conventionally dried vegetables of equivalent water activity stored at comparable temperatures. The present products also exhibit excellent rehydration rates and superior texture and appearance upon rehydration. In its method aspect, the invention resides in improved infusion techniques, including infusion of particularly defined alkaline buffer systems and tocopherol into the vegetable pieces. The instant dried vegetables find particular suitability for use in shelf stable packaged dry mixes for oriental or stir fry meals, dry mixes for cold pasta salads and casseroles.

87 Claims, No Drawings

DRIED GREEN VEGETABLE AND METHOD OF PREPARATION

This is a continuation of U.S. patent application Ser. No. 923,992, filed Oct. 28, 1986, entitled Shelf Stable Green Vegetable and Method of Preparation.

BACKGROUND OF THE INVENTION

1. Technical Field

The present invention relates to food products and to their methods of preparation. More particularly, the present invention relates to processed intermediate moisture vegetables of enhanced shelf stability and to infusion methods of their preparation.

2. Background Art

Dried packaged convenience foods or mixes are popular from which can be prepared foods such as soups, casseroles and salads. These packaged foods frequently contain dehydrated vegetables of various types along with various other dried ingredients especially pastas. Ideally, the vegetables would rehydrate quickly. Further, upon rehydration, the rehydrated vegetables would resemble as closely as possible fresh vegetables in terms of color, appearance, texture and nutrition.

Rehydrated green vegetables are especially vulnerable to exhibit color degradation compared to freshly blanched green vegetables. The color degradation is due in part to the deterioration of chlorophyll. Yellow vegetables in contrast are less susceptible to color loss.

Conventionally, vegetables are dehydrated using forced hot air convection drying. In the normal air drying of vegetables, approximately 75% of the moisture is removed during the first 25% of the drying time. In the final 75% of the drying time, a mere 20% of the original moisture is removed. In the final 75% of the drying time most of the flavor, texture and initial color loss occurs. Moreover, because of high energy input and slow throughput through capital intensive equipment such processes have proved to be expensive. With most common vegetables, the maximum moisture content after dehydration permissible consistent with color stability is approximately 5% or a water activity ("Aw") of about 0.4 but good commercial practice is for the moisture content to be considerably lower and this prolongs the time of processing of vegetables so treated. Thus, while further drying results in greater initial color loss, it reduces subsequent color loss upon storage and so provides greater overall color stability.

The terms "dry" and "dehydrated" are occasionally used informally or even interchangably in the art. For purposes of the present invention, the term "dehydrated" refers to vegetables having a moisture content of less than about 5% by weight and the verb "to dehydrate" means to dry to a dehydrated state. These terms are thus to be distinguished from "to dry" which is used herein merely to refer to some reduction in moisture content.

One straightforward technique to improve dried product qualities is to reduce drying times by reducing the size or thickness of the vegetable pieces. While this technique may be suitable for certain vegetables or parts, especially roots, e.g., carrots, this technique is undesirable to use with many vegetables or parts especially where a minimum size is needed in order to visually identify the vegetable, e.g., a broccoli floret. Another technique used to give the appearance of an improved product is to compensate for the natural color loss by the addition of dyes. Such dye addition is undesirable in view of regulatory and/or nutritional considerations. Still other techniques suggested for use for conventionally dried green vegetables is to reduce storage temperatures and to reduce exposure to oxygen. Each of these techniques improve color retention modestly.

For dry mixes containing dried vegetables of modestly superior quality in terms of color, flavor and texture upon rehydration, but still relying upon naturally occurring color it is common for manufacturers to use freeze-dried dehydrated vegetables. These however, are quite expensive, largely as a result of the high cost of capital equipment and high energy usage associated with their processing. In addition, because of their need to be maintained at a low moisture content, sophisticated packaging materials must be used for their storage and distribution.

Conventionally, air dried vegetables also can suffer from poor rehydration rates and poor texture upon rehydration. The prior art includes numerous improvements in conventionally air dried vegetables or fruits directed in part toward overcoming these two problems. For example, the prior art teaches infusion of a wide variety of solutes, especially salt and/or polyols for vegetables (see, for example, U.S. Pat. No. 4,361,589 issued Nov. 30, 1982 to Wauters et al. which discloses infusion of sugars from an alkaline solution to realize dried infused celery) and sugars or sugar alcohols for fruits (see, for example, U.S. Pat. No. 4,350,711 issued Sep. 21, 1982 to M. L. Kahn) have been introduced into the vegetables whereby the water activity of the dried product can be substantially reduced so that "intermediate moisture" but nonetheless shelf stable dried products can be prepared. The art also includes methods for finely controlling the amounts of solutes infused and for reduction of drying times (see for example, U.S. Pat. No. 4,447,460, issued May 8, 1984 to Lewis et al.) which involve pre-drying prior to application of carefully controlled addition of salt brine while the vegetables are still warm.

Sugar and sugar alcohols are, however, typically not used in connection with vegetables because of the undesirable sweetness they impart when used at levels effective to provide water activity control. The infused products, when boiled with water, or when boiling water is poured on to them, rehydrate more rapidly because of the presence of solutes which induce more rapid intake of water into the vegetable tissue. Unfortunately, while effective to improve the rehydration and texture problems of air dried vegetables, the infusion treatment aggravates initial color loss and can even accelerate subsequent color deterioration.

The food processing art also includes many teachings with respect to canned vegetable formulation and processing. While the objectives of providing a finished product as similar as possible to freshly cooked or blanched green vegetables are the same as those of the present invention, the teachings unfortunately are of little value. In canned products, vegetables have been subjected to retorting conditions to ensure stability and the vegetables exist in storage in an aqueous, sterile environment. In contrast, dried vegetables are not subjected to such temperatures and exist in a dehydrated environment. Because of these differences, the chemical pathways for color degradation are materially different and thus the teachings of the canning art have no reliable predictive value when applied to dried vegetable processing.

Notwithstanding these numerous art attempts at providing dried vegetables, to date, no shelf-stable dried green vegetable has been developed, or any method of preparing such a product, which not only possesses the desired texture and rehydration advantages of infused vegetables but also substantially retains its green color for extended periods when stored at room temperatures.

Accordingly, it is an object of the present invention to provide dried green vegetables with superior color compared to dried vegetables of comparable water activity when stored at room temperature.

It is another object of the present invention to provide dried green vegetables when superior color compared when stored at reduced or frozen temperatures compared to conventional dried vegetables.

Still another object of the present invention is to provide relatively large vegetable pieces with improved color retention and rehydrated texture properties.

Another object of the present invention is to provide dried, infused vegetables which nonetheless have color at least equal to air dried vegetables of equivalent water activity when stored at room temperature.

Another object of the present invention is to provide methods of preparing dried vegetables suitable for use with vegetable flowers, vegetable fruits and roots.

A still further object of the present invention is to provide methods of preparing vegetables which can be used with mixtures of green and yellow vegetables.

Another object of the present invention is to provide a simple, but reliable, process for the dehydration of vegetables wherein color retention is substantially improved.

It has been surprisingly discovered that the above objectives can be realized and dried vegetable products can be provided which are shelf stable and which nonetheless retain a very high portion of their green color for extended periods by infusing alkaline buffer systems and tocopherol along with conventional solutes in controlled amounts.

SUMMARY OF THE INVENTION

Disclosed are dried, infused green vegetables characterized by superior color retention when stored at room temperature. The infused vegetables have a water activity of about 0.3 to 0.7. The vegetables are infused with about 10% to 60% of water activity controlling solutes and with about 50 to 200 ppm magnesium. The vegetables are also infused with sufficient amounts of an alkaline buffer system having a pH of about 7 to 9 to provide a buffering capacity of about 0.05 to 0.35 milliequivalents of hydrochloric acid per gram of vegetable solids.

In its method aspect, the present invention resides in improved methods for preparing dried green vegetables of improved color stability.

The present methods comprise a first step of blanching the vegetables with an aqueous, alkaline blanch fluid for a time sufficient for enzyme inactivation. The blanch bath has a pH ranging from about 7.0 to 9.0.

Thereafter, the blanched vegetable pieces are infused with sufficient amounts of water soluble water activity controlling solutes to increase the total solids level in the pieces to about 40% of weight. Among the infusion solutes is a buffer system having a pH in water ranging from 7 to 9.

The infused pieces are then dehydrated to a water activity of about 0.3 to 0.85, preferably 0.3 to 0.7 at a temperature of less than about 135° F.

DETAILED DISCLOSURE OF THE INVENTION

The present invention relates to dried green vegetables which exhibit superior retention of color for extended time periods even at room temperature storage. The present products also exhibit superior texture upon rehydration as well as excellent rehydration rates. In its method aspect, the present invention relates to the processes by which such products are prepared. Each of these product attributes as well as the steps in the present methods of preparation as well as product use are described in detail below.

Throughout the specification and claims, percentages are by weight and temperatures in degrees Fahrenheit unless otherwise indicated.

As indicated above, it is especially difficult to provide dried green vegetables especially those strongly green in color, i.e., those high in chlorophyll, e.g., broccoli, peas, pea-pods, green beans, green bell peppers and the like, compared with yellow vegetables or only weakly green, e.g., celery, which upon rehydration possess the color, taste, texture and appearance of fresh vegetables. Certain green vegetables, especially broccoli, present even greater challenges due to difficulties of providing an intact rehydrated piece. Dried broccoli florets are typically extremely fragile. Thus, while dried broccoli is commercially available, the average particle size is small, typically ranging from about $\frac{1}{4}''$ to $\frac{1}{2}''$ square rather than being in the form of whole florets. Dried broccoli florets also are unfortunately particularly susceptible to color loss.

While the present invention has utility in the provision of dried green vegetables, generally, the present invention finds particular suitability in connection with broccoli, especially broccoli florets. Further, the present invention finds utility not only with green vegetable flowers or florets, but also with vegetable fruits, e.g., beans, edible pea-pods, green peppers and also for vegetable roots or other plant structures, e.g., asparagus. Also, while the present invention is especially suitable for use for green vegetables, it has been surprisingly discovered that storable mixtures of green and yellow vegetables can be prepared, whether processed individually and subsequently blended in their dried state or even processed together and dried mixed.

Evaluation of food products attributes frequently is highly subjective. Deterioration in color, while broadly capable of being measured by mere observation, fortunately is susceptible to objective analytical determination. For the present invention, color measurement and evaluation is provided using a MacBeth Colorimeter as a measuring instrument.

The MacBeth Colorimeter is a well known color measuring device and is used extensively in, for example, the paint industry. In particular, a MacBeth Model 1500T colorimeter is employed. The colorimeter measures the color of the vegetable pieces and gives values using the familiar Hunter L, a, b, three dimensional color scale. Generally, the "L" scale ranges from zero to one hundred with zero being black and one hundred being pure white. The "a" scale similarly measures the red-green continuuum while the "b" scale measures the blue-to-yellow scale. Multiple (6) readings per sample are averaged to yield single measurement data with at least $\frac{1}{4}$ rotation of the sample during the readings. Thus, every vegetable will have a particular spacial point in the Hunter three-dimensional color universe designated by specific coordinates with respect to each of these three axes.

It is contemplated that the present food products will be packaged in a dark, anaerobic substantially oxygen impermeable package and all color values, both for the present food products, as well as values for conventional dried vegetables taken for comparison reflect this packaging type.

After preparation and anerobically packaging, color degradation is primarily a relationship with two independent variables, time and temperature. The present green vegetables are characterized by extended shelf stability in terms of color retention at room temperatures and retain about 80% of their initial green color values even after six months of room storage. However, even greater advantages in terms of color retention are provided when the green vegetables are stored at reduced temperatures. At present, food products are distributed through one of three defined temperature distribution systems: room temperature, refrigerated (32° to 45° F.) and frozen (0° to 32° F.).

In view of the foregoing, the present dried green vegetables can each be defined broadly in terms of color retention or change in color ("Δe") where Δe is calculated by $$"\Delta e" = \sqrt{\Delta L^2 + \Delta a^2 + \Delta b^2},$$

on the Hunter scale axis normalized to fresh blanched vegetables

Conceptually, the above expression can be understood as vector in three-dimensional space describing approximately a quadrant of a sphere in the Hunter color scale three-dimensional universe laying in the green-yellow sector. The center of the sphere is the color point for green vegetables of the particular type immediately after blanching, e.g., freshly blanched green brocholi florets. This center point is designated as the zero point or as "0-0-0" values, relatively, on the Hunter scales. This zero color point changes modestly with such factors as season, geography, vegetable type, etc. A green vegetable will have a particular color represented by a spacial point. The value of "Δe" defines a distance from the zero point to the spacial point of the green vegetable or a radius. The radius of the sphere grows as a function of time and temperature. As time and temperature progress the sphere, or degradation in color from the zero point, grows. The surface of the sphere sector thus defines the boundary in terms of the improved color retention characteristic. Inside the surface of the sphere sector are the present products while products of the prior art have spacial points outside the sphere. Generally, the smaller the sphere, the closer is the color to the zero or center point or the color of fresh blanched vegetables. Sphere growth thus indicates color loss or decay.

At time zero, i.e., after drying, the value for $\Delta e_0$ is small but finite due to some color loss during the processing of the present invention. However, well outside of the sphere at time zero will be, for example, green vegetables which have been conventionally dried or green dried vegetables infused with certain solutes but not the present buffer system described below. As the sphere grows as a function of time and temperature the spacial point of the conventionally dried green vegetable will also drift as it losses color further away from the zero point than it started but always staying outside of the sphere until well after the storage life of the present products under protected storage.

Another independent variable which defines the present food products is their Aw values. Of course, once packaged, the water activity of the vegetable pieces becomes a fixed parameter. At higher Aw values, the rate of color deterioration is greater than at lower Aw values. Fortunately, the water activity of the present pieces can be closely controlled using any of several controllable factors including moisture content, and type and amounts of infused solutes.

The present vegetables exhibit superior color retention when stored at room temperature for extended times, e.g., six months to a year at 70° F. Thus, the changes in color, Δe, of the present vegetables are small. Indeed, very little color change or Δe is evidenced at six months, i.e., the $\Delta e_6$ is small. While greater color change is evident at twelve months, i.e., $\Delta e_{12}$ is larger. All relative comparisons are to infused vegetables not containing the to-be-described buffer system. Thus, the present vegetables can be defined in terms of a maximum color change Δe at two time points six months and one year. Since color retention is also a function of water activity Aw, then the color retention feature of the present invention is conveniently defined and described by a simple pair of empirical equations relating color retention and water activity, namely $$\Delta e_6 \leq \Delta e_0 + k\, Aw$$

$$\Delta e_{12} \leq \Delta e_0 + k\, Aw$$

While reducing the water activity of vegetable pieces is desirable from a color retention standpoint, lower Aw values can lead to disadvantages. To achieve lower Aw values, typically, drying times must be extended resulting in both higher costs and to exposure of the pieces to the higher temperatures characteristic of drying for longer times. The later can result in initial color loss. Also, pieces which have been dried to lower Aw values have lower rehydration rates. Further, such pieces might not rehydrate completely. Additionally, the crispness or final texture can be adversely affected.

The vegetable pieces herein are characterized essentially by water activities of about 0.30 to 0.85. At the high end, i.e., above 0.7, the present vegetables must be refrigerated or frozen. For better results in terms of optimization of color retention, rehydration rates, shelf stability (i.e., stability at room temperature) and final texture, the Aw desirably range from about 0.30 to 0.7 and for best results about 0.30 to 0.45.

Method of Preparation

In its method aspect, the present invention resides in improved infusion processes for preparing dried infused vegetables involving the steps in sequence of blanching, infusion and drying.

A. Blanching

Uncooked vegetable pieces, preferably raw, especially whole brocholi florets, are obtained by means common in the art. 1"×¾ square are especially suitable as starting broccoli florets. Frozen vegetables can be used by thawing prior to infusion. Also suitable for use are whole edible pea-pods, also known as snow-peas. Whole green beans can be used, although cutting of end stem pieces is contemplated. Large pieces, e.g., 1.0" to 3.0"×1.0" to 3.0" green pepper pieces can be employed. Where practical, smaller sizes are desired since less time is necessary for blanching, infusion and drying. Suitable vegetable size ranges are listed in Table 1.

TABLE 1

Sizes of Vegetables Suitable for Processing

| Vegetable | Range | Preferred Range |
|---|---|---|
| Broccoli Florets | Whole floret heads to 1/4" sq. | 1½" sq. to ½" sq. |
| Broccoli Stems | 3/8" to 1/8" sq. | ¼" sq. to ½" sq. |
| Pea-pods | Whole pods to 1/8" sq. | Half pea-pods to ¼" slices |
| Celery | ¼" sq. | ¼" sq. to ½" sq. |
| Brussel Sprouts | 1" diameter | 1.5" to 1" diameter |
| Cucumbers | slices by ⅛" | ⅛ to ⅜" slices |
| Turnips | ½" × 1" strips | ½" × 1" strips |
| Spinach | ½" × 1" strips | ½" × 1" strips |
| Aspargus | Any size, even whole | 2" pieces |

The pieces are then subjected to an essential blanch step for enzyme inactivation such as by immersion into a blanch bath having a temperature ranging from about 80° C. to 100° C. at atmospheric pressure for about 45 to 360 seconds.

The blanch operation, of course, results in the deactivation of enzymatic activity in the vegetable pieces. Additionally and importantly, the blanch step is practiced so as to maximize the green color brightening effect.

The blanch bath essentially includes sufficient amounts of alkaline ingredients to maintain the pH of the blanch bath of a pH of about 7 to 9. If the pH drops below about 7, then the vegetable pieces can develop an undesirable olive green color. At excessively high pH values, undesirable off-flavor development as well as color degradation can each occur. Exemplary alkali including sodium, potassium, magnesium and calcium based salts and can include all edible common hydroxides and carbonates, although magnesium carbonate is preferred. Addition of conventional materials such as bisulfite is to be avoided and thus the blanch water is desirably free of sulfites for health safety concerns.

Preferably, the vegetable pieces are added to a substantially excess of blanch bath such as, at a blanch minimum, a bath ratio of at least 10:1 water to pieces.

In preferred embodiments, after removal from the blanch bath, the pieces are rapidly cooled such as by being placed in a blast freezer, freezer tunnel or ice water bath until the pieces are cooled to a temperature of about 32° to 45° F., preferably 32° to 40° F.

B. Infusion

The blanched vegetable pieces so prepared and essentially prior to any drying, i.e., having their natural ripe water content typically of about 90%, can then be infused with certain solutes or infusion materials. While the precise infusion means or technique is not critical, it has been found that in the preferred embodiment, infusion can be most practically accomplished by soaking the vegetable pieces in a specially prepared solution or bath containing a number of essential components prior to any drying.

A first essential component of the infusion bath or infusion solute is a polyhydric alcohol or "polyol." The term "polyhydric alcohol" refers to alcohols with two or more hydroxyl groups. Although it is intended to include the most typical such alcohols, namely, glycerol, sorbitol, mannitol, propylene glycol and mixtures thereof, the term also applies to a variety of sugar alcohols which may be classed by the number of hydroxyl groups in the general formula, $HOCH(CHOH)_nCH$ $CH$, where "n" has values from 2 to 5, like tetritols, penitols, hexitols, heptitols, etc., as well as stereoisomers thereof. In general, these polyols are water-soluble, crystalline compounds with small optical rotations in water and have a slightly sweet to a very sweet taste. Due to the practical problems of cost, availability, flavor, regulatory approval, etc., glycerol is the most preferred polyol ingredient. Desirably, the polyhydric alcohol comprises about 5 to 30%, preferably about 10 to 20% of the infusion bath.

A second component of the infusion bath can be a sugar. Sugar has the advantage of being much less expensive than glycerol while nonetheless providing desired humectant properties. In addition to common sucrose, the term "sugar" refers to any of a number of useful saccharide materials which are capable of increasing the osmotic pressure of the water in which they are dissolved and thereby giving rise to the requisite bacteriostatic effect. Included on the list of useful sugars are the non-reducing and reducing water-soluble monosaccharides and the reducing and non-reducing polysaccharides and their degradation products; e.g., pentoses, including aldopentoses, methylpentoses, keptopentoses, like xylose and arabinose; a deoxyaldose like rhamnose, hexoses and reducing saccharides such as aldohexoses like glucose, galactose and mannose; the ketohexoses, like fructose and sorbose; disaccharides and maltose; non-reducing disaccharides such as a sucrose and other polysaccharides such as dextrin and raffinose; and hydrolyzed starches which contain as their constituents oligosaccharides, especially those based upon corn, i.e., corn syrups or corn syrup solids. The sugars should also be of a low molecular weight so as to offer a substantial effect in increasing the osmotic pressure of the sugar solution.

Highly preferred for use herein are low sweetness sugars such as maltose. Especially useful herein are high maltose corn syrups such as Satin Sweet marketed by Cargill which is 81% solids of which 65% is maltose, 3% dextrose and 20% higher saccharides. Most preferred for use herein are maltose corn syrups such as 63 DE marketed by Cargill which is about 84% solids of which 28% is maltose and 40% dextrose. The sugar component can comprise from about 0% to 50% of the infusion bath, preferably about 0.1% to 40% and, for best results about 35%. In more preferred embodiments, at least 35% of the sugar component is maltose.

Another essential bath ingredient is an alkaline buffering system or agent(s). Failure to infuse an alkaline buffer into the green vegetables, e.g., broccoli florets can result in substantial reductions in the moderation of the green color loss benefits of the present invention. Unfortunately, vegetables have relatively little natural buffering capacity. Preferred for use herein are buffering agents or systems which provide a buffered pH ranging from about 7.0 to 9.0 in pure water, preferably about 7.5 to 8.5. Due to the presence of the other infusion bath ingredients, the ionic effectiveness of the buffer system is reduced and infusion bath pH will typically range from about 6 to 8, preferably about 6.8 to 7.5.

More than a simple pH adjustment of the infusion brine is involved in the present invention. If mere pH adjustment were all that is required, simple low level addition of sodium hydroxide or other alkali or alkaline material, e.g., sodium sulphite salts would be sufficient.

Buffers are well known and the skilled artisan will have no problem selecting suitable buffer systems or materials for use herein which will achieve the above indicated desirable pH values. Typical buffer systems will essentially comprise a plurality of materials including a highly alkaline first water soluble buffer agent which upon water addition will result in a pH ranging from about 8.0 to 9.0 and further essentially comprise a second less alkaline or even acidic water soluble buffer agent which upon water addition will result in a pH ranging from about 6.0 to 7.0. Preferred buffer systems include the following:

TABLE 2

| 1. | Disodium phosphate/monosodium phosphate |
|---|---|
| 2. | Tetra potassium pyrophosphate/sodium acid pyrophosphate |
| 3. | Ammonium bicarbonate/ammonia |
| 4. | Bicarbonate buffer |
| 5. | Ammonium hydroxide/ammonia |
| 6. | Citric acid/sodium citrate or ascorbate/ascorbic acid |
| 7. | Citric acid/disodium phosphate |
| 8. | Trisodium phosphate/disodium phosphate. |

The amount of buffering system desirable in the solution will depend on several factors including the particular buffer system components, the infusion bath ratio (discussed below), type of vegetable, duration of infusion step and final Aw to be achieved. Generally, however, good results are obtained when the buffer system comprises about 0.1 to 3.0%, preferably 0.5 to 2.5% and about 0.9 to 2.0% for best results.

In certain preferred embodiments, still another essential ingredient is a bittering agent also sometimes referred to as antisweeteners in amounts sufficient to moderate the sweetness resulting from the sugars infusion. Exemplary bittering agents include potassium chloride and magnesium chloride. Preferred for use herein are mixtures of bittering agents since mixtures especially KCl and $MgCl_2$ potentiate each's individual bittering affect. Generally, good results are obtained when the infusion baths comprise about 0.1 to 1.0%, preferably about 0.2 to 0.5% of a bittering agent. The amount of bittering agent to be added depends on several factors including the material selected, the amounts and types of sugars employed, the vegetable type being prepared and, to a limited extent, the end use contemplated. For example, if a dried "sweet and sour" mix is contemplated, less bittering agent may be requred than a dried chow mein dinner.

Magnesium chloride is preferred also for the reason that the infusion solution in preferred embodiments essentially comprises about 0.01% to 0.1%, preferably about 0.02% to 0.03% magnesium which can be supplied in whole in part by the magnesium chloride serving as the bittering agent or as other water soluble magnesium salts, e.g., magnesium carbonate. Magnesium is important to maintaining the chlorophyll having a magnesium ion center and characterized by a bright green color rather than degrading to a hydrogen centered molecule characterized by an undesirable olive green color.

In one highly preferred embodiment, the infusion bath further essentially includes a surfactant. Useful herein are high Hydrophobic-Lypophobic Balance "HLB" number surfactants, i.e., those having HLB values of 12–14. Such surfactants speed the infusion process. Another benefit from surfactant infusion is a reduction in the stickiness of the products realized herein. The infusion bath essentially comprises about 0.1 to 1.5%, preferably about 0.5 to 1.0%. For best results, the infusion bath comprises about 0.7 to 1.0% surfactant. Food grade emulsifers are well known and the skilled artisan can readily select materials useful herein from those widely available. Exemplary materials include mono and di-glycerides (e.g., Campul POE-O ™), lecithin, sodium oleate, polyoxyethylene sorbitan monooleate (Tween-80 ™), gum acacia and mixtures thereof.

Still another preferred water activity controlling solute is common salt. Preferably, the infusion bath comprises about 1 to 6% salt, preferably 2 to 4% salt.

In still another highly preferred embodiment, the infusion bath additionally comprises about 0.05 to 0.2% of fat soluble anti-oxidant such as vitamin E or tocopherol, BHA, BHT or mixtures thereof. Utilization of the fat soluble anti-oxidant is especially useful when dried vegetables of higher Aw's are to be prepared such as ranging from about 0.4 to 0.75. A mixed blend of alpha, beta, gamma and delta tocopherols can be used. Surprisingly, it has been found important to avoid anti-oxidants such as propyl galate, or TBHQ inasmuch as such materials adversely lead to decreased color retention rates. When tocopherol is added to the infusion bath, it is essential that a surfactant also be added in order to disperse the tocopherol and to allow its infusion into the vegetable pieces.

The duration of the infusion step can be expressed equivalently in two ways. First, and more simply, the infusion step is continued until the moisture content of the vegetable piece has been reduced from a native or pristine value of about 90% to less than 60%, preferably less than 55%. In practice, at room temperature, the infusion step can be completed in about 1 to 12 hours. Some moisture removal from the broccoli can occur as a result of osmotic drying. Typically, the vegetable material percentage of the pieces increases from a native level of about 10% to about 20% in the infused vegetable. Also, about an equivalent amount (or about 20% by weight of the infused wet vegetable) of solutes are infused in the pieces. While not critical, the infused vegetables typically have water activities of about 0.9 after completion of the infusion step.

The present invention can be practiced at atmospheric pressure. If desired, however, reduced pressures ranging from about 100 to 200 Torr can be employed. Such reduced pressures can be used to accelerate modestly the infusion step.

The present infusion step can be practiced from cold (e.g., 32° F., 0° C.) to warm, e.g., 130° F., 54° C. temperatures. Preferably, the bath temperature ranges from about 35° to 75° F., 2° to 25° C. On the one hand, higher temperatures, however, are undesirable due to the potential for color loss. On the other hand, at higher temperatures, the infusion step is accelerated resulting in shorter processing times.

Desirably, the infusion bath ratio is high and at a minimum is at least 2.5:1, preferably about 5:1 bath to pieces, in order to assure complete coverage of the vegetables by the bath.

The infusion bath can also optionally contain conventional levels of such adjuvant materials as flavorings, seasonings, preservatives, nutritional supplements, vitamins and the like.

While in the preferred embodiment, the means for infusing solutes into the vegetables comprises an infusion bath, the skilled artisan will appreciate that other conventional infusion techniques can be employed without departing from the spirit of the invention. For example, a spray operation, to infuse the infusion solutes via a nozzled spray of an infusion solution or brine onto and into the vegetables which provides an equivalent infusion treatment in terms of solutes infusion can be used, if desired.

C. Drying

The infused vegetables, especially broccoli florets prepared above are thereafter removed from the infusion bath, drained and adhered bath solution is removed. Advantageously, the infused vegetables can be placed in a basket-type centrifuge which is rotated at, for example, 1600 RPM for 1.5 minutes to remove the adhering solution as quickly as possible without damage. While this treatment removes adhering moisture, it does not dry the vegetable, thereby allowing it to remain with its natural although partially lowered water content.

Thereafter, the infused vegetables are essentially dried sufficiently so as to be suitable for room temperature storage such as to an Aw ranging from about 0.3 to 0.85, preferably 0.30 to 0.70, and for best results in terms of color stability room temperature storage to about 0.30 to 0.45. Those embodiments to be stored at reduced or even frozen storage do not require as extensive dehydration and can be dried to an Aw ranging from 0.70 to 0.85. Any conventional drying technique or means can be used to practice the drying step. Preferred for use herein is forced hot air convection drying, although vacuum, freeze drying, microwave and combinations of drying techniques can be used. Especially preferred for use herein is forced hot air convection drying conducted at temperatures no greater than 135° F. (58° C.) to minimize heat damage and to preserve the fresh green color. In the most preferred embodiment, the drying is practiced at a relative humidity of about 25% as well as at the above controlled temperature.

The resultant dried infused vegetables are then allowed to cool and are packaged in a sealed, oxygen impermeable package desirably flushed with a substantially oxygen free (<1000 ppm $O_2$), e.g., nitrogen, prior to sealing or optionally, vacuum packed. The packaged dried vegetables have remarkable and unexpected extended storage stability overall and especially with respect to green color retention as compared to infused dried vegetables with comparable levels of sugar, salt and polyol solutes but without the essential buffer system and tocopherol and are comparable to non-infused dried vegetables each of comparable water activity similarly packaged and stored. Amazingly, in certain embodiments, broccoli florets can be stored for as long as six months at room temperature with relatively high color stability. After six months, however, although overall color remains improved, color deterioration rates accelerate.

It is to be appreciated however that even the color retention benefits of the present invention can be destroyed by heat shock, i.e., even brief exposures to high temperatures. Such temperatures can easily be reached if the product is exposed during distribution or shipping unprotected to the temperatures reached in a rail side car or truck trailer during summer. Thus, in commercial operation, care should be taken so that distribution is protected, i.e, that the temperature of the product during distribution be no greater than 100° F.

In certain embodiments, broadly, in addition to water activity, the dried infused vegetables are additionally characterized by comprising (1) about 10% to 60% by weight total water activity controlling solutes including:

(a) about 10 to 30% infused polyol, preferably about 10 to 25%, and for best results about 15 to 20%, (b) about 0 to 30% sugars, preferably about 0.1 to 25%, and for best results about 10 to 20%, (c) about 1.0 to 6.0% salt, preferably about 2.0 to 4.0%, and for best results about 2 to 3%, (d) about 0.5 to 2.0% bittering agent, preferably about 0.5 to 1.0%, and for best results about 0.5 to 0.75, and (2) a moisture content of about 10 to 40%, preferably about 10 to 25% and for best results about 10 to 15%, (3) total vegetable solids content of about 14% to 45%, preferably about 20 to 45 and for best results about 35 to 40, (4) sufficient buffer system to buffer about 0.05 to 0.35 milliequivalents of hydrochloric acid per g of vegetable solids, preferably about 0.10 to 0.30. The buffer capacity of the vegetables is measured simply by mixing 10 g of milled vegetables in 90 g distilled water and titrating with acid.

Preferred embodiments additionally comprise (5) about 50 to 200 ppm atomic magnesium, preferably about 70 to 150, and for best results about 120 ppm, (6) about 200 to 800 ppm tocopherol, preferably 300 to 600, (7) about 0.05 to 0.2% surfactant, preferably 0.06 to 0.15.

The vegetables are substantially free of sulfites yet nonetheless exhibit exceptional color stability.

Specifically, the present invention provides infused dried broccli florets having an Aw of about 0.3 to 0.7 and a color retention of 6 months at room temperature storage (70° F.) defined by the empirical equation:

$$\Delta e_6 \leq 4 + 8.5 \, Aw$$

Where $\Delta e_6$ is the difference in e values measured on the Hunger scale with the MacBeth Colorimeter between the broccoli florets after six months of room temperature storage and fresh blanched broccoli. And $e_{12}$ is the difference after 12 months of room temperature storage:

$$\Delta e_{12} \leq 4 + 18.5 \, Aw$$

Preferably, the broccoli florets are defined by the color retention of:

$$\Delta e_6 \leq 3 + 8.0 \, Aw$$

$$\Delta e_{12} \leq 3 + 17.6 \, Aw$$

Even better broccoli florets are defined by the color retention of $$\Delta e_6 \leq 2 + 7.5 \, Aw$$

$$\Delta e_{12} \leq 2 + 16.80 \, Aw$$

Preferred broccoli embodiments can be further defined by comprising:

about 15 to 30% polyol, preferably 17 to 25%,
about 0.1 to 30% sugars, preferably 10% to 25%,
about 0.5 to 3.5% salt, preferably about 2.0 to 3.0,
About 50 to 200 ppm atomic magnesium, preferably about 70 to 150,
about 0.5 to 1.0% bittering agent, preferably about 0.5 to 0.75,
about 0.1 to 0.35 milliequivalents of HCl per g vegetable solid of buffer capacity, preferably about 0.15 to 0.25.

More preferred broccoli floret embodiments additionally comprise:
about 200 to 600 ppm tocopherol, preferably 300 to 500,
about 0.05 to 0.2% surfactants, preferably 0.07 to 0.15%.

Additionally, one embodiment of the present invention specifically provides pea-pods having an Aw of about 0.3 to 0.7 and a color retention at room temperature storage of:

$$\Delta e_6 \leq 4.5 + 8.80 \, Aw$$

$$\Delta e_{12} \leq 4.5 + 18.70 \, Aw$$

Preferably, the pea-pods are defined by the color retention of:

$$\Delta e_6 \leq 3.5 + 8.20 \, Aw$$

$$\Delta e_{12} \leq 3.5 + 17.85 \, Aw$$

Even better pea-pods are defined by the color retention of:

$$\Delta e_6 \leq 3 + 7.65 \, Aw$$

$$\Delta e_{12} \leq 3 + 17.0 \, Aw$$

Preferred pea-pod embodiments can be additionally defined by comprising:
about 10 to 30% polyol, preferably 15 to 25%,
about 10 to 40% sugars, preferably 15 to 25%,
about 1.0 to 4.5% salt, preferably 2.0 to 4.0%,
about 50 to 200 ppm atomic magnesium, preferably 70 to 150 ppm,
about 0.5 to 10% bittering agent, preferably about 0.5 to 0.75%,
about 0.1 to 0.35 milliequivalents of a buffer system, preferably about 0.15 to 0.25.

More preferred pea-pod embodiments additionally comprise:
pH of 7.0 to 8.0, preferably 7.0 to 7.4,
about 200 to 600 ppm tocopherol, preferably 300 to 500,
about 0.05 to 0.2% surfactant, preferably 0.07 to 0.15.

While not wishing to be bound by the proposed theory, it is speculated herein that the infused buffer neutralizes acidic intermediate compounds such as reductones generated during storage through degradation mechanisms such as the Mailard reaction. In addition to preventing deterioration by reacting with intermediates and thus blocking chemical degradation pathways, the infused buffer system keeps interstital and cell moisture in a favorable alkaline range for longer periods which has a positive effect on chlorophyll stability and thus color retention. Additional color stability from the tocopherol and magnesium ions is provided by interrupting chemical degradation pathways not yet understood.

Importantly, the present superior infused dried vegetables can be characterized by a novel level of buffer capacity. The present vegetables have a buffer capacity of about 0.05 to 0.35 milliequivalents of HCl per gram of vegetable solids. Preferably the present dried vegetables have a buffer capacity of about 0.20 to 0.30 milliequivalents per gram. As noted above, vegetables have little native buffering capacity and thus the major contributor to the vegetable buffer capacity is the infused buffer system.

Surprisingly, yellow vegetables, e.g., squash, corn, carrots and the like can be similarly infused with the present buffer systems and other solutes whether processed together with the green vegetables or processed separately and thereafter admixed with green vegetables for packaging. While yellow vegetables do not experience any improvements in yellow color stability, the yellow color is not adversely affected that much. By virtue of being at the same pH as the buffered, infused green vegetables, undesirable acid-base reactions can be minimized at the surface where the green and yellow vegetables touch.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food arts, can be undertaken without departing from the spirit and scope of this invention.

EXAMPLE 1

1,000 g vegetables of cut, fresh broccoli florets ($\frac{3}{4}'' \times 1''$) were obtained and were blanched in a distilled hot (195° F.) water bath comprising 0.06% $MgCO_3$ for three minutes at a temperature of 195° F. The blanched broccoli florets were rapidly cooled by being placed in an ice bath.

Thereafter, the cooled blanched broccoli florets were infused with an aqueous infusion bath having the following composition:

| Ingredient Composition | Weight % |
| --- | --- |
| Glycerine | 15.00 |
| 63 D.E. Corn Syrup | 30.00 |
| NaCl | 3.00 |
| KCl | 0.38 |
| $MgCO_3$ | 0.03 |
| Disodium Phosphate | 0.90 |
| Monosodium Phosphate | 0.05 |
| Surfactant[1] | 1.00 |
| Tocopherol | 0.10 |
| Water - distilled | Balance |

[1] A polyoxyethylene sorbitan monooleate ester marketed under the trade name of Tween 80 by ICI America's Inc.

The ratio of bath to vegetable was 5:1. The infusion step time was about four hours. The pH of the vegetable pieces was checked every hour during infusion to insure that its pH was about 7.2. Upon completion of the infusion step, the vegetables had a moisture content of about 55%.

The infused brocoli florets had the following approximated composition:

| Ingredient | Weight % |
| --- | --- |
| Glycerol | 10.34 |
| Total Sugars | 10.70 |
| Chloride | 2.06 |
| Potassium Chloride | 0.40 |
| Magnesium | 0.12 |
| Vegetable Solids | 20.26 |
| Balance | |
| Water | |
| Tocopherol | |
| Surfactant | |

Thereafter, the infused broccoli pieces were dried with forced hot air convection drying at 110° F. with a relative humidity of 25% until the vegetable pieces reached a water activity of between 0.45 to 0.50. Thereafter, about 50 g of the infused vegetables were packed in an air tight, oxygen impermeable foil pouch package, flushed with nitrogen, sealed and stored at room temperature.

After drying the infused broccoli florets had the following composition (wet basis):

| Ingredient | Weight % |
| --- | --- |
| Glycerol | 20.68 |
| Sugars | 20.80 |
| Glucose 12.4% | |
| Maltose 8.4% | |
| Sucrose | |
| Sodium chloride | 4.00 |
| Potassium chloride | 0.77 |
| Vegetable solids | 28.40 |
| Moisture | 12.49 |
| Surfactant | 0.15 |
| Magnesium | 230 ppm |
| Tocopherol | 450 ppm |

The vegetables had a pH of 7.4 and about 0.25 milliequivalents of HCl per g of vegetable solids.

The dried, infused vegetables so prepared exhibited excellent color stability even after six months of storage.

EXAMPLE 2

1,000 g vegetables of fresh whole snow pea-pods were obtained and were blanched in a distilled hot (195° F.) water bath comprising 0.457% di-sodium phosphate, 0.025% mono-sodium phosphate and 0.05% tetra sodium EDTA (ethylene diamine tetra acetate) for three and one half minutes at a temperature of 195° F. The blanched pea-pods were rapidly cooled by being placed in an ice bath.

Thereafter, the cooled blanched pea-pods were infused with an aqueous infusion bath having the following composition:

| Ingredient Composition | Weight % |
| --- | --- |
| Glycerine | 15.00 |
| 63 D.E. Corn Syrup | 30.00 |
| NaCl | 3.00 |
| KCl | 0.37 |
| MgCO$_3$ | 0.03 |
| Buffer | |
| Tetra Potassium Pyro Phosphate | 0.90 |
| Sodium Acid Pyro Phosphate | 0.16 |
| Surfactant (Tween 80 ™) | 1.00 |
| Tocopherol | 0.10 |

| Ingredient Composition | Weight % |
| --- | --- |
| Water (distilled) | Balance |

The ratio of bath to vegetable was 5:1. The infusion step time was overnight at 40° F. The pH of the vegetable pieces was checked every hour during infusion to insure that its pH was about 7.2. Upon completion of the infusion step, the vegetables had a moisture content of about 55%.

Thereafter, the infused pea-pods were dried as in Example 1 with forced hot air convection drying at 110° F. with a relative humidity of 25% until the vegetable pieces reached a water activity of between 0.45 to 0.50. Thereafter, about 50 g of the infused vegetables were packed in an air tight, oxygen impermeable foil pouch package, flushed with nitrogen, sealed and stored to room temperature.

After drying the infused pea-pods had the following composition (wet basis):

| Ingredient | Weight % |
| --- | --- |
| Glycerol | 20.60 |
| Sugars | 22.50 |
| Glucose 13.7% | |
| Maltose 7.5% | |
| Sucrose 1.3% | |
| Sodium chloride | 4.78 |
| Potassium chloride | 0.84 |
| Vegetable solids | 33.12 |
| Moisture | 16.52 |
| Surfactant | 0.15 |
| Magnesium | 144 ppm |
| Tocopherol | 450 ppm |

The vegetables had a pH of 7.2 and a buffering capacity of about 0.25 milliequivalents of HCl per gram of vegetable solids.

The dried, infused vegetables so prepared exhibited excellent color stability even after six months of storage.

EXAMPLE 3

1,000 g vegetables of cut, fresh broccoli florets (¾"×1") were obtained and were blanched in a distilled hot (212° F.) water bath comprising 0.06% MgCO$_3$ for 70 seconds at a temperature of 212° F. The blanched broccoli florets were rapidly cooled by being placed in an ice bath and drained.

Thereafter, the cooled blanched broccoli florets were infused with an aqeuous infusion bath having the following composition:

| Ingredient Composition | Weight % |
| --- | --- |
| Glycerine | 15.00 |
| 63 D.E. Corn Syrup | 30.00 |
| NaCl | 3.00 |
| KCl | 0.37 |
| MgCO$_3$ | 0.03 |
| MgCl | 0.37 |
| Disodium Phosphate | 0.90 |
| Monosodium Phosphate | 0.05 |
| Surfactant | 0.50 |
| Tocopherol | 0.05 |
| Water (distilled) | Balance |

The ratio of bath to vegetable was 5:1. The infusion step time was about four hours at 70° F. The pH of the vegetable pieces was checked every hour during infusion to insure that its pH was about 7.2. Upon completion of the infusion step, the vegetables had a moisture content of about 55%.

The infused brocoli florets had the following approximated composition:

| Ingredient | Weight % |
| --- | --- |
| Glycerol | 10.34 |
| Total Sugars | 10.70 |
| Chlordie | 2.06 |
| Potassium Chloride | 0.40 |
| Magnesium | 0.12 |
| Vegetable Solids | 20.26 |
| Balance | |
| Water | |
| Tocopherol | |
| Surfactant | |

Thereafter, the infused broccoli pieces were dried with forced hot air convection drying at 110° F. with a relative humidity of 25% for about 3 hours until the vegetable pieces reached a water activity of 0.50. Thereafter, about 50 g of the infused vegetables were packed in an air tight, oxygen impermeable foil pouch package, flushed with nitrogen, sealed and stored at room temperature.

After drying the infused broccoli florets had the following composition (wet basis):

| Ingredient | Weight % |
| --- | --- |
| Glycerol | 20.68 |
| Sugars | 20.80 |
| Glucose 12.4% | |
| Maltose 8.4% | |
| Sodium chloride | 4.00 |
| Potassium chloride | 0.77 |
| Vegetable solids | 28.40 |
| Moisture | 12.49 |
| Surfactant | 0.15 |
| Magnesium | 230 ppm |
| Tocopherol | 450 ppm |

The vegetables had a pH of 7.4 and $e_{12}$ of 8.2.

The dried, infused vegetables so prepared exhibited excellent color stability even after twelve months of storage.

EXAMPLE 4

1,000 g vegetables of cut, fresh broccoli florets ($\frac{3}{4}'' \times 1''$) were obtained and were blanched in a distilled boiling (212° F.) water bath comprising 0.06% MgCO$_3$ for 60 seconds. The blanched broccoli florets were rapidly cooled by being placed in an ice bath and drained.

Thereafter, the cooled blanched broccoli florets were infused with an aqueous infusion bath having the following composition:

| Ingredient Composition | Weight % |
| --- | --- |
| Glycerine | 10.00 |
| 63 D.E. Corn Syrup | 20.00 |
| NaCl | 2.00 |
| KCl | 0.25 |
| MgCO$_3$ | 0.03 |
| MgCl$_2$ | 0.25 |
| Disodium Phosphate | 1.80 |
| Monosodium Phosphate | 0.10 |
| Surfactant | 0.50 |
| Tocopherol | 0.50 |
| Water (distilled) | Balance |

The ratio of bath to vegetable was 10:1. The infusion step time was about four hours. The pH of the vegetable pieces was checked every hour during infusion to insure that its pH was about 7.2. Upon completion of the infusion step, the vegetables had a moisture content of about 57%.

The infused brocoli florets had the following approximated composition:

| Ingredient | Weight % |
| --- | --- |
| Glycerol | 10.10 |
| Total Sugars | 9.80 |
| Chlordie | 1.58 |
| Potassium Chloride | 0.34 |
| Magnesium | 0.12 |
| Vegetable Solids | 19.85 |
| Balance | |
| Water | |
| Tocopherol | |
| Surfactant | |

Thereafter, the infused broccoli pieces were dried with forced hot air convection drying at 110° F. with a relative humidity of 25% until the sample vegetable pieces reached a water activity of 0.3, 0.5 and 0.7, respectively. Thereafter, about 50 g of the infused vegetables of each water activity were packed in an air tight, oxygen impermeable foil pouch package, vacuum sealed, and stored at room temperature.

The dried, infused vegetables so prepared exhibited excellent color stability ever after six months of storage and had the following color retention properties:

| Water Activity | $\Delta e_6$ |
| --- | --- |
| 0.7 | 7.35 |
| 0.5 | 6.34 |
| 0.3 | 5.85 |

EXAMPLE 5

1,000 g vegetables of cut, fresh green peppers ($\frac{3}{8}'' \times 1''$) were obtained and were blanched in a distilled hot (195° F.) water bath comprising 0.06% MgCO$_3$ for three minutes at a temperature of 195° F. The blanched green pepper pieces were then rapidly cooled. Thereafter, the cooled blanched pepper pieces were infused with an aqueous infusion bath having the following composition:

| Ingredient Composition | Weight % |
| --- | --- |
| Glycerine | 15.00 |
| 63 D.E. Corn Syrup | 30.00 |
| NaCl | 3.00 |
| KCl | 0.38 |
| MgCO$_3$ | 0.03 |
| Disodium Phosphate | 0.90 |
| Monosodium Phosphate | 0.05 |
| Surfactant (Tween 80 ™) | 1.00 |
| Tocopherol | 0.10 |
| Water - distilled | Balance |

The ratio of bath to vegetable was 5:1. The infusion step time was about four hours. The pH of the vegetable pieces were checked every hour during infusion to insure that its pH was about 7.2. Upon completion of the infusion step, the vegetables has a moisture content of about 52%.

Thereafter, the infused pepper pieces were dried with forced hot air convection drying at 110° F. with a relative humidity of 25% until the vegetable pieces reached a water activity of between 0.45 to 0.50. Thereafter, about 50 g of the infused vegetables were packed in an air tight, oxygen impermeable foil pouch package, flushed with nitrogen, sealed and stored in room temperature.

After drying the infused broccoli florets had the following composition (wet basis):

| Ingredient | Weight % |
|---|---|
| Glycerol | 24.40 |
| Sugars | 21.60 |
| Glucose | 12.8% |
| Maltose | 7.4% |
| Fructose | 1.4% |
| Sodium chloride | 6.40 |
| Potassium chloride | 1.54 |
| Vegetable solids | 27.09 |
| Moisture | 17.67 |
| Surfactant | 0.20 |
| Magnesium | 107 ppm |
| Tocopherol | 400 ppm |

The vegetables had a pH of 7.2.

The dried, infused vegetables so prepared exhibited excellent color stability even after six months of storage.

EXAMPLE 6

1,000 g vegetables of cut, fresh broccoli florets ($\frac{3}{4}'' \times 1''$) were obtained and were blanched in a distilled hot (195° F.) water bath comprising 0.90% disodium phosphate and 0.05% monosodium phosphate for three minutes at a temperature of 195° F. The blanched broccoli florets were rapidly cooled by being placed in an ice bath.

Thereafter, the cooled blanched broccoli florets were infused with an aqueous infusion bath having the following composition:

| Ingredient Composition | Weight % |
|---|---|
| Glycerine | 20.00 |
| 63 D.E. Corn Syrup | 40.00 |
| NaCl | 4.00 |
| KCl | 0.49 |
| MgCL$_2$ | 0.49 |
| Disodium Phosphate | 1.20 |
| Monosodium Phosphate | 0.07 |
| Surfactant[1] | 1.00 |
| Tocopherol | 0.10 |
| Water (distilled) | Balance |

[1] A polyoxyethylene sorbitan monooleate ester marketed under the trade name of Tween 80 by ICI America's Inc.

The ratio of bath to vegetable was 2.5:1. The infusion step time was about two hours. The pH of the vegetable pieces was checked every hour during infusion to insure that its pH was about 7.2. Upon completion of the infusion step, the vegetables had a moisture content of about 48%.

The infused brocoli florets had the following approximated composition:

| Ingredient | Weight % |
|---|---|
| Glycerol | 12.65 |
| Total Sugars | 12.98 |
| Sodium Chloride | 1.26 |
| Potassium Chloride | 0.24 |
| Magnesium | 0.07 |
| Vegetable Solids | 23.85 |
| Balance | |
| Water | |
| Tocopherol | |
| Surfactant | |

Thereafter, the infused broccoli pieces were dried with forced hot air convection drying at 110° F. with a relative humidity of 25% until the vegetable pieces reached a water activity of between 0.45 to 0.50. Thereafter, about 50 g of the infused vegetables were packed in an air tight, oxygen impermeable foil pouch package, flushed with nitrogen, sealed and stored at room temperature.

After drying the infused broccoli florets had the following composition (wet basis):

| Ingredient | Weight % |
|---|---|
| Glycerol | 20.68 |
| Sugars | 21.23 |
| Glucose | 12.74% |
| Maltose | 8.49% |
| Sucrose | |
| Sodium chloride | 4.94 |
| Potassium chloride | 1.19 |
| Vegetable solids | 28.40 |
| Moisture | 12.49 |
| Surfactant | 0.15 |
| Magnesium | 150 ppm |
| Tocopherol | 450 ppm |

The vegetables had a pH of 7.4.

The dried, infused vegetables so prepared exhibited excellent color stability even after six months of storage.

EXAMPLE 7

1,000 g vegetables of cut, fresh broccoli florets ($\frac{3}{4}'' \times 1''$) were obtained and were blanched in a distilled hot (212° F.) water bath comprising 0.06% MgCO$_3$ for one minute at a temperature of 212° F. The blanched broccoli florets were rapidly cooled by being placed in an ice bath.

Thereafter, the cooled blanched broccoli florets were infused with an aqueous infusion bath having the following composition:

| Ingredient Composition | Weight % |
|---|---|
| Glycerine | 15.00 |
| 63 D.E. Corn Syrup | 30.00 |
| NaCl | 3.00 |
| KCl | 0.38 |
| MgCO$_3$ | 0.03 |
| Disodium Phosphate | 0.90 |
| Monosodium Phosphate | 0.05 |
| Surfactant[1] | 1.00 |
| Tocopherol | 0.10 |
| Water (distilled) | Balance |

[1] A polyoxyethylene sorbitan monooleate ester marketed under the trade name of Tween 80 by ICI America's Inc.

The ratio of bath to vegetable was 5:1. The infusion step time was about four hours. The pH of the vegetables pieces was checked every hour during infusion to insure that its pH was about 7.2. Upon completion of the infusion step, the vegetables had a moisture content of about 55%.

The infused brocoli florets had the following approximated composition:

| Ingredient | Weight % |
|---|---|
| Glycerol | 10.34 |
| Total Sugars | 10.70 |
| Chloride | 2.06 |
| Potassium Chloride | 0.40 |
| Magnesium | 0.12 |
| Vegetable Solids | 20.26 |
| Balance | |
| Water | |
| Tocopherol | |
| Surfactant | |

Thereafter, the infused broccoli pieces were dried with forced hot air convection drying at 110° F. with a relative humidity of 25% until the vegetable pieces reached a water activity of between 0.45 to 0.50. Thereafter, about 50 g of the infused vegetables were packed in an air tight, oxygen impermeable foil pouch package, flushed with nitrogen, ($O_2 \leq 1000$ ppm) sealed and stored at room temperature.

After drying the infused broccoli florets had the following composition (wet basis):

| Ingredient | Weight % |
|---|---|
| Glycerol | 20.168 |
| Sugars | 20.80 |
| Glucose | 12.4% |
| Maltose | 8.4% |
| Sucrose | |
| Sodium chloride | 4.00 |
| Potassium chloride | 0.77 |
| Vegetable solids | 28.40 |
| Moisture | 12.49 |
| Surfactant | 0.15 |
| Magnesium | 230 ppm |
| Tocopherol | 450 ppm |

The vegetables had a pH of 7.4 and about 0.25 milliequivalents of HCl per g of vegetable solids.

The dried, infused vegetables so prepared exhibited excellent color stability even after six months of storage.

What is claimed is:

1. A dried, green vegetable food product exhibiting superior color retention upon storage and crispness upon rehydration, comprising:
   infused dried broccoli pieces having substantially native levels of vegetable solids
   1. a water activity ("Aw") of about 0.3 to 0.85,
   2. a six month color retention rate ($\Delta e_6$) of $$\Delta e_6 \leq 4 + 8.5 \, Aw$$

and a twelve month color retention rate ($\Delta e_{12}$) of:

$$\Delta e_{12} \leq 4 + 18.5 \, Aw \text{ and};$$

a dark, sealed, substantially oxygen impermeable package having an anaerobic atmosphere within which are disposed the broccoli pieces.

2. The food product of claim 1 wherein the broccoli pieces comprise florets wherein the broccoli pieces are infused prior to drying with water activity controlling/stabilizing water-soluble solutes therein in amounts sufficient to effect a reduction in moisture content to less than 60% by weight and wherein the broccoli pieces are additionally infused with a buffering system to effect an interstitial moisture pH value ranging from about 7 to 9 in amounts sufficient to provide a buffer capacity of about 0.05 to 0.35 milliequivalents of HCl per gram of vegetable solids.

3. The food product of claim 2 wherein the broccoli florets have a six month color retention ($\Delta e_6$) rate of:

$$\Delta e_6 \leq 3 + 8.0 \, Aw$$

and a twelve month color retention ($\Delta e_{12}$) of:

$$\Delta e_{12} \leq 3 + 17.6 \, Aw.$$

4. The food product of claim 3 wherein the water activity ranges from about 0.3 to 0.7.

5. The food product of claim 4 wherein the broccoli florets additionally comprise about 50 to 200 ppm atomic magnesium.

6. The food product of claim 5 wherein the broccoli florets comprise:
   about 15 to 30% by weight of a sugar alcohol;
   about 0.1 to 30% by weight sugar(s); and
   about 0.5 to 3.5% by weight sodium chloride.

7. The food product of claim 6 additionally comprising about 0.5% to 1% by weight of a bittering agent.

8. The food product of claim 7 wherein the bittering agent is selected from the group consisting of potassium chloride, magnesium chloride, and mixtures thereof.

9. The food product of claim 8 wherein the broccoli florets additionally comprise:
   about 200 to 600 ppm of an anti-oxidant selected from the group consisting of tocopherol, BHA, BHT and mixtures thereof; and,
   about 0.5 to 0.2% of a surfactant having a high hydrophobic-lypophobic balance ("HLB") number.

10. The food product of claim 9 wherein the broccoli florets comprise:
    about 17 to 25% by weight of a sugar alcohol;
    about 1 to 25% sugar;
    about 2 to 3% salt;
    about 70 to 150 ppm atomic magnesium;
    about 0.5 to 0.75% of a bittering agent;
    about 300 to 500 ppm tocopherol;
    about 0.07 to 0.15% surfactant; and
    sufficient amounts of the buffering system to provide a buffer capacity of about 0.15 to 0.25 milliequivalents of HCl.

11. The food product of claim 10 wherein the bittering agent compriss potassium chloride and magnesium chloride.

12. The food product of claim 11 wherein the florets have a six month color retention ($\Delta e_6$) of:

$$\Delta e_6 \leq 2 + 7.5 \, Aw$$

and a 12 month color retention ($\Delta e_{12}$) of:

$$\Delta e_{12} \leq 2 + 16.8 \, Aw.$$

13. The food product of claim 12 having a total vegetable solids content of about 14% to 45% by weight.

14. The food product of claim 11 wherein the buffer system comprises a bicarbonate buffer.

15. The food product of claim 11 wherein the buffer system comprises an ammonium bicarbonate/ammonia buffer.

16. The food product of claim 6 wherein the buffer system comprises a bicarbonate buffer.

17. The food product of claim 6 wherein the buffer system comprises an ammonium bicarbonate/ammonia buffer.

18. The food product of claim 2 wherein the buffer system comprises a bicarbonate buffer.

19. The food product of claim 2 wherein the buffer system comprises an ammonium bicarbonate/ammonia buffer.

20. A method for preparing dried green vegetables of improved color retention and crispness upon rehydration, comprising the steps in sequence of:
  A. Blanching raw green vegetable pieces in a hot aqueous fluid for a time sufficient for enzyme inactivation, said bath having a pH ranging from about 7 to 9 to yield blanched vegetable pieces;
  B. Infusing the blanched vegetable pieces with an infusion solution comprising
    1. about 5% to 30% by weight of the infusion solution of a sugar alcohol,
    2. about 0% to 50% by weight of the infusion solution of sugar(s),
    3. about 0.1% to 3.0% of the infusion solution of a buffer having a pH in distilled water of about 6 to 9,
    4. about 0.1% to 1% by weight of the infusion solution of a water soluble bittering agent, the balance of the infusion solution of water, for a time sufficient and a pressure to reduce the moisture content to less than about 60% to form infused vegetable pieces; and
  C. Drying the infused vegetable pieces at a temperature of less than about 135° F. to a water activity ranging from about 0.3 to 0.85 to form dried infused vegetable pieces.

21. The method of claim 20 wherein in step B, the aqueous infusion step is practiced by providing sufficient amounts of the infusion solution to form a bath and immersing the vegetable pieces within the bath and wherein the infusion solution comprises
  10% to 20% by weight of the infusion solution of a sugar alcohol;
  0.1% to 40% by weight of the infusion solution of a sugar(s),
  about 0.5% to 2.5% by weight of the buffer,
  about 0.3% to 0.7% by weight of a bittering agent,
  about 0.1% to 1.5% by weight of an anti-oxidant selected from the group consisting of tocopherol, BHA, BHT, and mixtures thereof, and,
  about 0.1% to 1.5% of a surfactant having a high hydrophobic-lypophobic number and, wherein the weight ratio of infusion bath to vegetable pieces is at least 2.5 to 1.

22. The method of claim 21 wherein the buffer system comprises a bicarbonate buffer.

23. The method of claim 21 wherein the buffer system comprises an ammonium bicarbonate/ammonia buffer.

24. The food product prepared by the process of claim 21.

25. The method of claim 21 wherein the sugar comprises maltose.

26. The food product prepared by the process of claim 25.

27. The method of claim 25 wherein the buffer system comprises a bicarbonate buffer.

28. The method of claim 25 wherein the buffer system comprises an ammonium bicarbonate/ammonia buffer.

29. The method of claim 21 wherein the aqueous infusion solution is in a weight ratio of infusion solution to pieces of at least about 2.5:1 and wherein the infusion bath additionally comprises sufficient amounts of a water soluble magnesium salt to provide the infusion bath with about 0.01% to 0.1% of the bath of atomic magnesium.

30. The food product prepared by the process of claim 29.

31. The method of claim 29 wherein the buffer system comprises a bicarbonate buffer.

32. The method of claim 29 wherein the buffer system comprises an ammonium bicarbonate/ammonia buffer.

33. The method of claim 29 wherein the aqueous infusion solution comprises
  about 0.9% to 2% by weight of the infusion solution of the buffer, and
  wherein in step B the infused vegetables have been infused for a time and a pressure sufficient to reduce the moisture content to less than 57%.

34. The food product prepared by the process of claim 33.

35. The method of claim 33 wherein the infusion solution additionally comprises:
  about 0.1% to 20% by weight salt, and
  wherein step B is practiced with the infusion solution having a temperature ranging from about 32° to 130° F. (0° to 54° C.).

36. The food product prepared by the process of claim 35.

37. The method of claim 35 wherein the weight ratio of infusion solution to pieces is at least 5:1 and wherein the infusion solution comprises about 0.5% to 1.0% by weight of a surfactant having a high hydrophobic-lypophobic balance ("HLB") number.

38. The food product prepared by the process of claim 37.

39. The method of claim 37 wherein the vegetable pieces are selected from the group consisting of broccoli florets or stems, edible pea-pods, celery, brussel sprouts, cucumbers, turnips, spinach, asparagus, and mixtures thereof and wherein the sugar alcohol is glycerol.

40. The food product prepared by the process of claim 39.

41. The method of claim 39 wherein the infusion step is practiced at a pressure ranging from about 100 to 200 Torr.

42. The food product prepared by the process of claim 41.

43. The method of claim 39 wherein the vegetable pieces are broccoli florets.

44. The method of claim 39 wherein the vegetable pieces are edible pea-pods.

45. The method of claim 39 wherein the vegetable pieces are celery pieces.

46. The method of claim 39 wherein the vegetable pieces are brussels sprouts.

47. The method of claim 39 wherein the vegetable pieces additionally comprise yellow vegetable pieces.

48. The method of claim 33 wherein the buffer system comprises a bicarbonate buffer.

49. The method of claim 33 wherein the buffer system comprises an ammonium bicarbonate/ammonia buffer.

50. The food product prepared by the process of claim 20.

51. The food product of claim 20 wherein the buffer system comprises a bicarbonate buffer.

52. The food product of claim 20 wherein the buffer system comprises an ammonium bicarbonate/ammonia buffer.

53. A dried, vegetable food product exhibiting superior color retention when stored and crispness upon rehydration, comprising: dried infused pea-pod pieces having substantially native levels of vegetable solids
   1. a water activity ("Aw") of about 0.3 to 0.85;
   2. a six-month color retention rate ($\Delta e_6$) of $$\Delta e_6 \leq 4.5 + 8.80 \, Aw;$$

and, a twelve month color retention rate ($\Delta e_{12}$) of:

$$\Delta e_{12} \leq 4.5 + 18.70 \, Aw \text{ and};$$

a dark, sealed, substantially oxygen impermeable package having an anaerobic atmosphere within which are disposed the pea-pod pieces.

54. The food product of claim 53 wherein the pea-pods are infused prior to drying with water activity controlling/stabilizing water-soluble solutes therein in amounts sufficient to effect a reduction in moisture content to less than 60% by weight and wherein the pea-pod pieces are additionally infused with a buffering system to effect an interstitial moisture pH value ranging from about 7 to 9 in amounts sufficient to provide a buffer capacity of about 0.05 to 0.35 milliequivalents of HCl per gram of vegetable solids.

55. The food product prepared by the process of claim 54.

56. The food product of claim 54 wherein the pea-pod pieces are infused with a buffering system to effect an interstitial moisture pH value ranging from about 7 to 9 and in amounts sufficient to provide a buffer capacity of about 0.1 to 0.35 milliequivalents of HCl per gram of vegetable solids.

57. The food product of claim 56 wherein the pea-pods pieces have a six month color retention ($\Delta e_6$) of:

$$\Delta e_6 \leq 3.5 + 8.2 \, Aw;$$

and, a twelve month color retention ($\Delta e_{12}$) of:

$$\Delta e_{12} \leq 3.5 + 17.85 \, Aw.$$

58. The food product of claim 57 wherein the water activity ranges from about 0.3 to 0.7.

59. The food product of claim 58 wherein the pea-pods pieces have a six month color retention ($\Delta e_6$) of:

$$\Delta e_6 \leq 3 + 7.65 \, Aw;$$

and, a twelve month color retention ($\Delta e_{12}$) of:

$$\Delta e_{12} \leq 3 + 17.0 \, Aw.$$

60. The food product of claim 59 wherein the pea-pods pieces comprise:
   about 10% to 30% by weight sugar alcohol;
   about 10% to 40% sugar;
   about 1% to 4.5% salt; and
   about 0.5% to 1% bittering agent.

61. The food product of claim 60 wherein the peapods pieces additionally comprise about 50 to 200 ppm atomic magnesium.

62. The food product of claim 61 wherein the buffer system comprises a bicarbonate buffer.

63. The food product of claim 60 wherein the peapods additionally comprise about 200 to 600 ppm of an antioxidant selected from the group consisting of tocopherol, BHA, BHT, and mixtures thereof.

64. The food product of claim 56 wherein the buffer system comprises a bicarbonate buffer.

65. The food product of claim 54 wherein the buffer system comprises a bicarbonate buffer.

66. The food product of claim 54 wherein the buffer system comprises an ammonium bicarbonate/ammonia buffer.

67. The food product prepared by the process of claim 53.

68. A food product of superior color retention, and crispness upon rehydration comprising pieces of at least one dried, infused green vegetable variety,
   having a substantially native level of vegetable solids,
   having a water activity ranging from about 0.3 to 0.85
   said vegetable pieces being infused with water activity controlling water soluble solutes in an amount sufficient to effect a moisture reduction to a moisture content of less than about 60%, and
   sufficient amounts of a buffer system having a pH in distilled water ranging from about 7 to 9 to provide the vegetables with about 0.05 to 0.35 milliequivalents of HCl per gram of vegetable solids, and
   a dark, sealed, substantially oxygen impermeable package having an anaerobic atmosphere within which are disposed the vegetable pieces.

69. The food product of claim 68 wherein the vegetable comprises:
   about 10% to 35% by weight moisture
   about 10% to 60% by weight water activity controlling solutes, and
   about 14% to 45% vegetable solids.

70. The food product of claim 69 wherein the water activity ranges from about 0.3 to 0.7.

71. The food product of claim 70 wherein the vegetable pieces additionally comprise about 200 to 800 ppm of an anti-oxidant selected from the group consisting of tocopherol, BHA, BHT, and mixtures thereof; and
   about 0.05% to 0.2% of a surfactant having a high hydrophobic-lypophobic balance ("HLB") number and about 0.15 to 0.25 milliequivalents of HCl of the buffer system.

72. The food product of claim 71 additionally comprising about 50 to 200 ppm atomic magnesium.

73. The food product of claim 72 comprising a plurality of green vegetable varieties.

74. The food product of claim 73 wherein at least one vegetable variety is a yellow vegetable.

75. The food product of claim 74 wherein the green vegetables are selected from the group consisting of broccoli florets or stems, edible pea-pods, celery, brussel sprouts, cucumbers, turnips, spinach, asparagus, green peppers and mixtures thereof.

76. The food product of claim 71 wherein the buffer system comprises a bicarbonate buffer.

77. The food product of claim 70 wherein the vegetable pieces are infused with sufficient amounts of the buffer system to provide a buffer capacity of about 0.10 to 0.30 milliequivalents of HCl per gram of vegetable solids.

78. The food product of claim 77 wherein the vegetable is broccoli florets.

79. The food product of claim 78 wherein the vegetable comprises about 15% to 30% by weight of a sugar alcohol, about 0.5% to 3.5% by weight sugar.

80. The food product of claim 79 wherein the vegetable additionally comprises about 200 to 800 ppm of an antioxidant selected from the group consisting of tocopherol, BHA, BHT, and mixtures thereof.

81. The food product of claim 80 additionally comprising about 0.05% to 0.2% by weight of a surfactant having a high hydrophobic-lypophobic balance number.

82. The food product of claim 81 wherein the buffer system comprises a bicarbonate buffer.

83. The food product of claim 81 additionally comprising about 0.5% to 1% by weight of a bittering agent.

84. The food product of claim 77 wherein the vegetable is edible pea-pods.

85. The method of claim 63 wherein the sugar alcohol is glycerol.

86. The food product of claim 69 wherein the buffer system comprises a bicarbonate buffer.

* * * * *

UNITED STATES PATENT AND TRADEMARK OFFICE
CERTIFICATE OF CORRECTION

PATENT NO. : 4,832,969
DATED : May 23, 1989
INVENTOR(S) : Theodore S. Lioutas

It is certified that error appears in the above-identified patent and that said Letters Patent is hereby corrected as shown below:

| | |
|---|---|
| Col. 3, line 15 | "when" should be -- with --. |
| Col. 5, line 40 | "brocholi" should be -- broccoli --. |
| Col. 6, line 61 | "brocholi" should be -- broccoli --. |
| Col. 12, line 46 | "Hunger" should be -- Hunter --. |
| Col. 13, line 46 | "10%" should be -- 1.0% --. |
| Col. 16, line 19 | "to" should be -- at --. |
| Col. 19, line 1 | "were" should be -- was --. |
| Col. 19, line 3 | "has" should be -- had --. |
| Col. 19, line 11 | "in" should be -- at --. |
| Col. 22, line 44 | "sugar;" should be -- sugar(s); --. |

Signed and Sealed this

Seventeenth Day of April, 1990

*Attest:*

HARRY F. MANBECK, JR.

*Attesting Officer*    *Commissioner of Patents and Trademarks*